(12) United States Patent
Mimura et al.

(10) Patent No.: US 11,339,844 B2
(45) Date of Patent: May 24, 2022

(54) COIL SPRING ASSEMBLY

(71) Applicant: NHK SPRING CO., LTD., Yokohama (JP)

(72) Inventors: Mitsuteru Mimura, Yokohama (JP); Norihiro Tajima, Yokohama (JP); Yosuke Kawai, Yokohama (JP); Shuji Takahashi, Yokohama (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 16/982,738

(22) PCT Filed: Mar. 26, 2019

(86) PCT No.: PCT/JP2019/013047
§ 371 (c)(1),
(2) Date: Sep. 21, 2020

(87) PCT Pub. No.: WO2019/189281
PCT Pub. Date: Oct. 3, 2019

(65) Prior Publication Data
US 2021/0003184 A1    Jan. 7, 2021

(30) Foreign Application Priority Data

Mar. 29, 2018   (JP) ............................. JP2018-065386

(51) Int. Cl.
*F16F 1/12*     (2006.01)
*F16F 1/04*     (2006.01)
*B60K 17/00*    (2006.01)

(52) U.S. Cl.
CPC .............. *F16F 1/125* (2013.01); *F16F 1/042* (2013.01); *B60K 17/00* (2013.01); *F16F 2228/001* (2013.01); *F16F 2238/026* (2013.01)

(58) Field of Classification Search
CPC .. F16F 1/122; F16F 1/123; F16F 1/125; F16F 1/042; F16F 1/043
See application file for complete search history.

(56) References Cited

U.S. PATENT DOCUMENTS 3,531,069 A * 9/1970 Dubberley ............ F16F 15/067
                                              248/565
3,901,494 A * 8/1975 Sena .................... B60G 17/021
                                              267/289

(Continued)

FOREIGN PATENT DOCUMENTS

GB        2 297 602 A       8/1996
JP       52-093866 A        7/1977
(Continued)

*Primary Examiner* — Nishal R Sahni
(74) *Attorney, Agent, or Firm* — Norris McLaughlin, P.A.

(57) ABSTRACT

A seat member has a seat portion, a receiving surface of which comes into contact with a bearing surface of an end turn portion, a mounting shaft portion protruded from the receiving surface of the seat portion, and an enlarged diameter portion formed at the front end of the mounting shaft portion for guiding press-fitting, in a cross section along an axial direction of a coil spring, an outer diameter of the enlarged diameter portion is set larger than an inner diameter of the end turn portion and an axial length of the enlarged diameter portion is set so that at least a maximum diagonal length of the seat member is larger than an inter-element wire distance.

15 Claims, 6 Drawing Sheets

(56) References Cited

U.S. PATENT DOCUMENTS

| | | | |
|---|---|---|---|
| 4,877,462 A | 10/1989 | Sugita | |
| 8,651,831 B2* | 2/2014 | Yagi | F04B 39/127 417/363 |
| 2008/0211156 A1* | 9/2008 | Check | F01L 1/462 267/170 |
| 2017/0152907 A1* | 6/2017 | Kato | F16F 1/123 |
| 2018/0010662 A1 | 1/2018 | de Lima Zocca et al. | |

FOREIGN PATENT DOCUMENTS

| | | |
|---|---|---|
| JP | 60-084832 U | 6/1985 |
| JP | 1-104719 A | 4/1989 |
| JP | 8-105479 A | 4/1996 |
| JP | 2005-313754 A | 11/2005 |
| JP | 2006-037976 A | 2/2006 |
| JP | 2007-064345 A | 3/2007 |
| JP | 2007-292271 A | 11/2007 |
| JP | 2017-087257 A | 5/2017 |
| JP | 2018-044644 A | 3/2018 |
| WO | 2015/194192 A1 | 12/2015 |
| WO | 2018/013418 A1 | 1/2018 |

\* cited by examiner

COIL SPRING ASSEMBLY

FIELD OF THE INVENTION

The present invention relates to a coil spring assembly used for a transmission damper for an automobile or the like.

BACKGROUND OF THE INVENTION

As a coil spring assembly of this type, there is conventional one that is provided with a coil spring and a seat member attached to an end turn portion of the coil spring as described in Patent document 1. The seat member has a seat portion and a mounting shaft portion.

The seat portion is formed into a circumferential shape to be brought into contact with an end face of the end turn portion of the coil spring. The mounting shaft portion is protruded at a center of the seat portion and is provided with an enlarged diameter portion at an axial front end thereof. The enlarged diameter portion is press-fitted into an inner periphery of the end turn portion of the coil spring, and the end turn portion which has ridden over the enlarged diameter portion engages with an outer periphery of the mounting shaft portion.

It, therefore, is possible to improve workability for mounting the seat member with respect to the coil spring and prevent a drop-off after the mounting.

In the conventional coil spring assembly, however, the seat member may be drop off from the coil spring when the seat member is rotated so as to be inclined relatively to an axial direction of the coil spring since an engaging margin between the seat member and an inner diameter of the coil spring is significantly small. This drop-off may be hereinafter referred to as a "rotational drop-off".

Further, if a load acts so as to pull the seat member out from the coil spring, the coil spring is bent so as to be rotated relatively to an axial direction of the seat member and the seat member may be drop off from the coil spring. This drop-off may be hereinafter referred to as a "axial drop-off".

In contrast, if an outer diameter of the enlarged diameter portion is enlarged, it is possible to prevent such drop-offs (rotational drop-off and axial drop-off) of the seat member due to the rotation relative to the axial direction between the coil spring and the seat member.

In this case, there, however, is a problem that the end turn portion is diametrally greatly enlarged and deformed at the time of press-fitting of the enlarged diameter portion into the end turn portion to generate fine cracks, thereby to deteriorate durability or be broken. Further, there is also a problem the enlarged diameter portion tends to interfere the coil spring after the press-fitting, thereby to generate hysteresis torque by preventing the seat member from rotating around the axis or deteriorate durability.

PATENT DOCUMENT 1: JP 2007-64345 A

SUMMARY OF THE INVENTION

A problem to be solved is that, if the drop-off of the seat member due to the rotation relative to the axial direction between the coil spring and the seat member tries to be prevented, the coil spring may be broken at the time of the press-fitting of the enlarged diameter portion of the seat member and the enlarged diameter portion of the seat member tends to interfere the coil spring after the press-fitting.

The present invention provides a coil spring assembly, capable of preventing a seat member from being drop off while preventing a coil spring from being damaged at the time of press-fitting of an enlarged diameter portion of the seat member and preventing the enlarged diameter portion of the seat member from interfering the coil spring after the press-fitting. The coil spring assembly comprises a coil spring that is provided with an end turn portion at each end of a body portion and a seat member attached to the end turn portion rotatably around an axis, wherein the seat member has a seat portion, a receiving surface of which comes into contact with a bearing surface of the end turn portion, a mounting shaft portion protruded from the receiving surface of the seat portion, and an enlarged diameter portion formed at a front end of the mounting shaft portion for guiding press-fitting, in a cross section along an axial direction of the coil spring, an outer diameter of the enlarged diameter portion is set larger than an inner diameter of the end turn portion and an axial length of the enlarged diameter portion is set so that at least a maximum diagonal length of the seat member is larger than an inter-element wire distance, the inter-element wire distance is a length spanning straightly between diametral innermost points at a 0.5-turn and a 1.0-turn of the end turn portion in a winding direction of the element wire of the coil spring, and the diagonal length is a length spanning straightly between a first point and a second point, the first point at which an outer periphery of the element wire and the mounting shaft portion are in contact with each other when a portion at which a side face of the enlarged diameter portion and a bottom face of the enlarged diameter portion join each other and the mounting shaft portion are in contact with the outer periphery of the element wire at the 0.5-turn of the end turn portion, the second point at which a straight line passing the first point and intersecting a central axis of the seat member and the side face of the enlarged diameter portion intersect each other.

Further, the present invention provides a coil spring assembly comprising a coil spring that is provided with an end turn portion at each end of a body portion and a seat member attached to the end turn portion rotatably around an axis, wherein the seat member has a seat portion, a receiving surface of which comes into contact with a bearing surface of the end turn portion, a mounting shaft portion protruded from the receiving surface of the seat portion, and an enlarged diameter portion formed at a front end of the mounting shaft portion for guiding press-fitting, the enlarged diameter portion has a straight portion having a side face straightly extending along an axial direction of the coil spring, and a front end portion provided closer to a front end of the enlarged diameter portion relative to the straight portion, a side face of which is formed into a chamfered shape or a tapered shape, and an axial length of the straight portion is 0.5 times or more a short diameter of an element wire of the coil spring.

The coil spring assembly according to the present invention prevents the seat member from being drop off from the end turn portion based on that the diagonal length of the seat member is larger than the inter-element wire distance of the end turn portion even if the seat member is rotated so as to be inclined relatively to the axial direction of the coil spring.

Moreover, since a drop-off load is increased while preventing increase of the outer diameter of the enlarged diameter portion according to the setting of the axial length of the enlarged diameter portion, the coil spring is prevented from being damaged at the time of press-fitting of the enlarged diameter portion of the seat member and the enlarged diameter portion of the seat member is prevented from interfering the coil spring after the press-fitting.

Further, in a case where the axial length of the straight portion is 0.5 times or more the short diameter of the element wire of the coil spring, it prevents reduction of the drop-off load in the axial direction of the seat member which is caused by that the coil spring bends so as to be rotated relatively to the axial direction of the seat member, thereby to prevent the seat member from being drop off from the end turn portion.

EMBODIMENT FOR CARRYING OUT THE INVENTION

Figure 1:
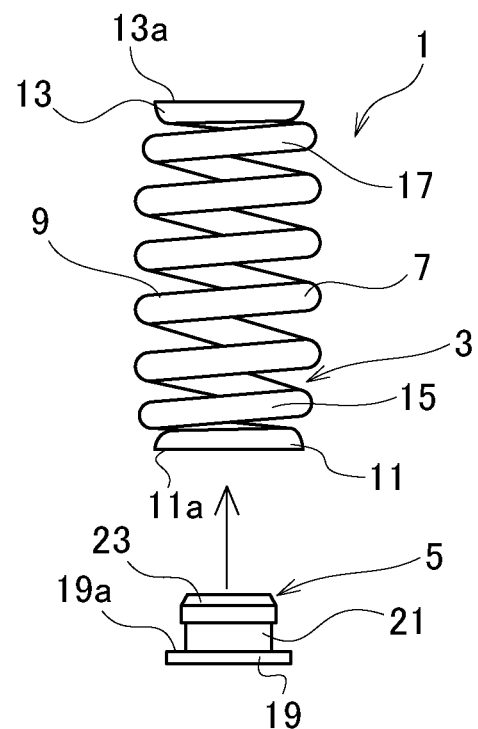
FIG. 1 is a side view explodingly illustrating a coil spring and a seat member of a coil spring assembly according to an embodiment 1 of the present invention.

The present invention accomplishes by setting of an axial length of the enlarged diameter portion of the seat member, the object being capable of preventing a seat member from being drop off while preventing a coil spring from being damaged at the time of press-fitting of an enlarged diameter portion of the seat member and while preventing the enlarged diameter portion of the seat member from interfering the coil spring after the press-fitting.

Namely, in a cross section of the enlarged diameter portion along an axial direction of the coil spring, an outer diameter of the enlarged diameter portion is set larger than an inner diameter of an end turn portion and an axial length of the enlarged diameter portion is set so that at least a maximum diagonal length of the seat member is larger than an inter-element wire distance.

The inter-element wire distance is a distance spanning between diametral innermost points at a 0.5-turn and a 1.0-turn of the end turn portion in a winding direction of the element wire of the coil spring.

The diagonal length is a length spanning straightly between a first point and a second point, the first point at which an outer periphery of the element wire and the mounting shaft portion are in contact with each other when a portion at which a side face of the enlarged diameter portion and a bottom face of the enlarged diameter portion join each other and the mounting shaft portion are in contact with the outer periphery of the element wire at the 0.5-turn of the end turn portion, the second point at which a straight line passing the first point and intersecting a central axis of the seat member and the side face of the enlarged diameter portion intersect each other.

Further, in a case where the enlarged diameter portion has a straight portion having a side face straightly extending along the axial direction of the coil spring, and a front end portion provided closer to a front end of the enlarged diameter portion relative to the straight portion, a side face of which is formed into a chamfered shape or a tapered shape, an axial length of the straight portion is preferably longer than an axial length of the front end portion.

The axial length of the straight portion may be 0.5 times or more a short diameter of the element wire of the coil spring.

A cross sectional shape of the element wire may be not only a circular sectional shape but also an oval sectional shape. In the oval sectional shape, a coil outer diameter side thereof may be configured by a semi-circular sectional shape portion of the element wire.

The outer diameter of the enlarged diameter portion may be smaller than the inter-element wire distance of the end turn portion.

Further, it may be configured that the coil spring has a transition portion between the body portion and the end turn portion, the end turn portion being formed up to a first turn so as to be diametrally reduced relatively to the body portion, the transition portion gradually diametrally enlarged from the end turn portion to the body portion, the mounting shaft portion is set to have an axial length defining a clearance or a zero-clearance between the enlarged diameter portion of the seat member and the end turn portion in a free state in which the end turn portion is fitted to the mounting shaft portion and the bearing surface of the end turn portion is in contact with the receiving surface of the seat portion, and the transition portion circumvents the enlarged diameter portion in a state in which the bearing surface of the end turn portion is in contact with the receiving surface of the seat portion.

The seat member may be configured to have a hole axially extending from a front end of the enlarged diameter portion.

The hole may be a bottomed hole.

Figure 2:
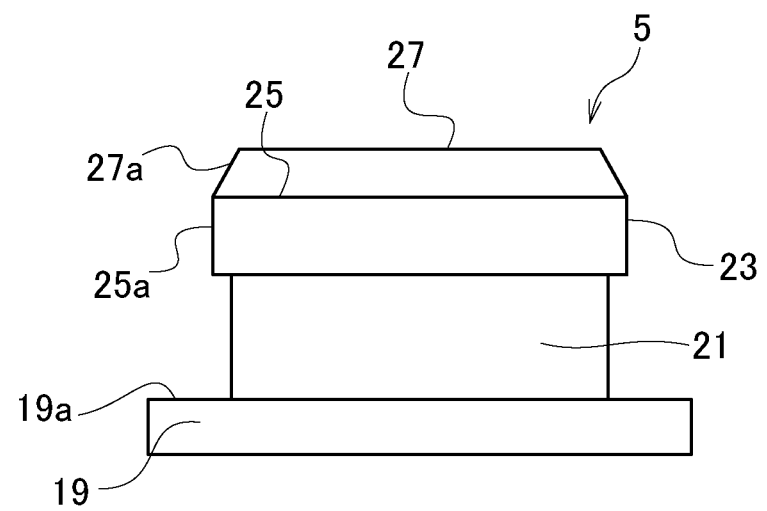
FIG. 2 is an enlarged side view of the seat member of FIG. 1.
Figure 3A:
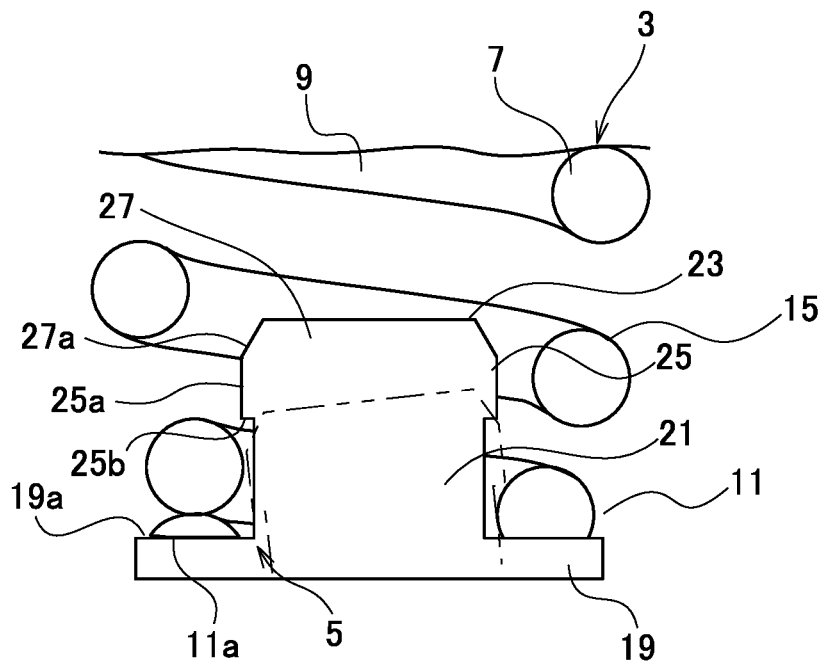
FIG. 3(A) is a sectional view illustrating the seat member attached to the coil spring and FIG. 3(B) is a sectional view showing a dimension of each part.
Figure 3B:
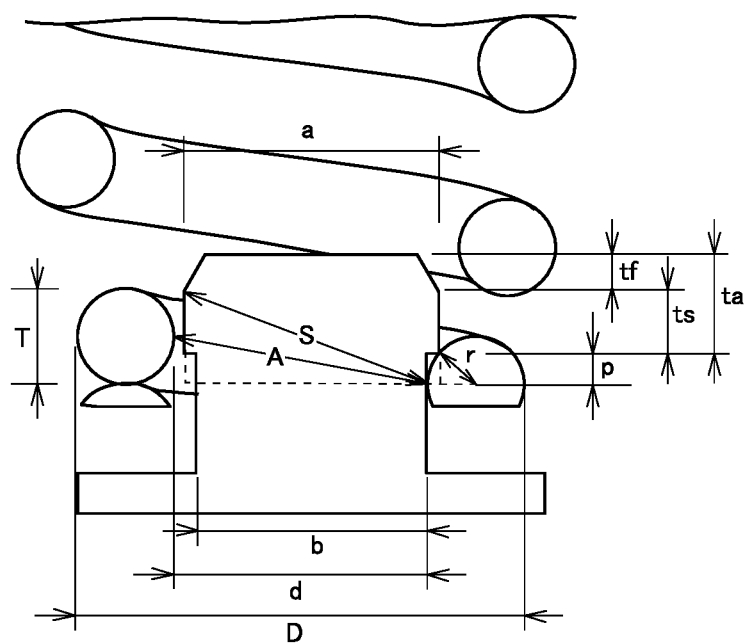

FIG. 1 is a side view explodingly illustrating a coil spring and a seat member of a coil spring assembly according to the embodiment 1 of the present invention, FIG. 2 is an enlarged side view of the seat member, FIG. 3(A) is a sectional view of the seat member attached to the coil spring, and FIG. 3(B) is a diagram showing a dimension of each part.

The coil spring assembly 1 of FIGS. 1-3 is used for, for example, a transmission damper for an automobile or the like.

The coil spring assembly 1 comprises a coil spring 3 and a seat member 5.

The coil spring 3 is formed by winding an element wire 7 in a coil shape. A material of the element wire 7 is not limited particularly, but, for example, oil-tempered silicon-chromium steel wire for springs (SWOSC) or high strength material.

The element wire 7 of the present embodiment is formed into a circular shape in a cross section intersecting a winding direction (or circumferential direction) and being along a diametral direction. With this, in the element wire 7, a diameter T of the coil spring 3 serves as a short diameter. In addition, the sectional shape of the element wire 7 may be an oval shape or what one of a diametrally inner side or a diametrally outer side is an oval shape (referring to the embodiment 3).

The coil spring 3 is provided with end turn portions 11, 13 on both sides of a body portion 9. The end turn portions 11, 13 are diametrally reduced relatively to the body portion 9, respectively, and are formed from end portions which are 0-turns up to 1-turns of the coil spring 3. Between the body portion 9 and the end turn portions 11, 13, transition portions 15, 17 being gradually diametrally enlarged from the end turn portions 11, 13 to the body portion 9 are provided, respectively.

Bearing surfaces 11a, 13a of the end turn portions 11, 13 are provided in a range of 180 degrees or more in the winding direction of the coil spring 3, 270 degrees (¾ turn) from a tip as a normal. Accordingly, the bearing surfaces 11a, 13a are brought into stably contact with and the end turn portions 11, 13 are seated on receiving surfaces of the seat member 5 which are described later.

The seat member 5 is not limited to particular material, but is what carbonitriding quenching and tempering are applied to iron material and, for example, is formed of carbon steel for machine construction (S45C, S60C, or the others), heading carbon steel (for cold heading) (SWCH) or the like.

A pair of the seat members 5, for example, are provided and are attached to both end turn portions 11, 13 rotatably around an axis. In FIG. 1, only the seat member 5 on one end turn portion 11 side is illustrated to be explained. In addition, the seat member 5 on the other end turn portion 13 side has the same structure as the seat member 5 on the end turn portion 11 side and its attaching structure is also the same as on the end turn portion 11 side.

The seat member 5 has a seat portion 19, a mounting shaft portion 21, and an enlarged diameter portion 23.

The seat portion 19 is formed into a circumferential shape and has the receiving surface 19a. An outer diameter of the seat portion 19 is formed equally to, slightly larger than, or slightly smaller than an outer diameter D of the end turn portion 11. With this, the seat portion 19 is brought into stably contact with the end turn portion 11.

The mounting shaft portion 21 is formed to be concentrically protruded from the receiving surface 19a of the seat portion 19, and the enlarged diameter portion 23 is formed at a front end of the mounting shaft portion 21 for guiding press-fitting. The details of the enlarged diameter portion 23 will be explained later.

The mounting shaft portion 21 is set to have an axial length defining a clearance or a zero-clearance between the enlarged diameter portion 23 of the seat member 5 and the end turn portion 11 in a free state in which the end turn portion 11 is fitted to the mounting shaft portion to bring the bearing surface 11a of the end turn portion 11 into contact with the receiving surface 19a of the seat portion 19.

Fitting the end turn portion 11 with the mounting shaft portion 21 is circumferentially conducted by the end turn portion 11 forming the 1st-turn of the coil spring 3 along the perimeter of the mounting shaft portion 21. Further, the end turn portion 11 is arranged so as to avoid a corner between the seat portion 19 of the seat member 5 and the mounting shaft portion 21.

An axial clearance between the end turn portion 11 and the enlarged diameter portion 23 only has to be of a degree to which the end turn portion 11 does not come into contact with the enlarged diameter portion 23 and does not need to be unnecessarily secured. A state of a zero-clearance means a state in which the end turn portion 11 is in contact with the enlarged diameter portion 23 and stress does not act on the end turn portion 11.

The transition portion 15 circumvents the enlarged diameter portion 23 is a state where the bearing surface 11a of the end turn portion 11 is in contact with the receiving surface 19a of the seat portion 19 so as not to bring the transition portion 15 into contact with the enlarged diameter portion 23.

The circumvention is performed so that the transition portion 15 gradually enlarges a convolution from the end turn portion 11 to the body portion 9. With this circumvention, the transition portion 15 does not come into contact with the enlarged diameter portion 23 or becomes a state of a zero-clearance even if the end turn portion 11 relatively moves in a diametral direction of the mounting shaft portion 21.

As illustrated in FIGS. 2-3, the enlarged diameter portion 23 of the seat member 5 is formed into a shaft shape diametrally enlarged relatively to the mounting shaft portion 21. The enlarged diameter portion 23 of the present embodiment is composed of a straight portion 25 and a front end portion 27.

The straight portion 25 has a side face 25a straightly extending along an axial direction of the coil spring 3, to define an outer diameter a of the enlarged diameter portion 23. The outer diameter a of the enlarged diameter portion 23 is larger than an inner diameter d of the end turn portion 11 to include a press-fitting margin.

The front end portion 27 is provided closer to an axial front end relative to the straight portion 25, a side face 27a of which is formed into a chamfered shape or a tapered shape. It should be noted that the chamfered or tapered side face 27a is an angled face in the present embodiment or it may be a rounded face or the like instead.

The enlarged diameter portion 23, in a cross section along the axial direction of the coil spring 3, the outer diameter a is set larger than the inner diameter d of the end turn portion 11 and an axial length to of the coil spring 3 is set so that at least a maximum diagonal length Smax is larger than an inter-element wire distance A. The outer diameter a of the enlarged diameter portion 23 of the present embodiment is set smaller than the inter-element wire distance A of the end turn portion 11. It should be noted that the outer diameter a may be set larger than the inter-element wire distance A of the end turn portion 11.

The inter-element wire distance A is a distance spanning between diametral innermost points at a 0.5-turn and a 1.0-turn of the end turn portion 11 in the winding direction of the element wire 7 of the coil spring 3. The innermost points are, in the cross section along the axial direction of the coil spring 3, portions located innermost in the diametral direction on the outer peripheries of the 0.5-turn and the 1.0-turn. The inter-element wire distance A is expressed by the following equation (1).

$$A = \{r2 + d2\}^{1/2} \quad (1)$$

Here, d is the inner diameter of the end turn portion 11 of the coil spring 3 and r is a radius of the element wire 7.

The diagonal length S is a length spanning between a first point and a second point, the first point at which an outer periphery of the element wire 7 and the mounting shaft portion 21 are in contact with each other when a portion at which the side face 25a of the enlarged diameter portion 23 and a bottom face 25b of the enlarged diameter portion 23 join each other and the mounting shaft portion 21 are in contact with the outer periphery of the element wire 7 at the 0.5-turn of the end turn portion 11, the second point (hereinafter referred to as "diagonal point") at which a straight line passing the first point and intersecting a central axis of the seat member 5 and the side face 25a of the enlarged diameter portion 23 intersect each other.

The maximum diagonal length Smax is a length when the diagonal length S is maximum. According to the present embodiment, the diagonal length S becomes maximum when the diagonal point is located at an upper end of the straight portion 25. (This length is hereinafter referred to as a maximum diagonal length Smax1.)

It should be noted that the diagonal point for the maximum diagonal length Smax may not be located at the upper end of the straight portion 25 according to the shape of the enlarged diameter portion 23. Further, although the maximum diagonal length Smax (Smax1) is set larger than the inter-element wire distance A as mentioned above, the diagonal length S may be set so that a shorter length other than the maximum diagonal length Smax (Smax1) is larger than the inter-element wire distance A.

The maximum diagonal length Smax1 is expressed by the following equation (2).

$$Smax1=\{(ts+p)2+[a-(a-b)/2]2\}^{1/2} \quad (2)$$

Here, b is an outer diameter of the mounting shaft portion 21. p is a distance from a lower end of the side face 25a of the enlarged diameter portion 23 to a horizontal line intersecting a center of the 0.5-turn, and it is expressed by the following equation (3).

$$p=\{r2-[r-(a-b)/2]2\}^{1/2} \quad (3)$$

Accordingly, the diagonal length Smax1 is expressed by the following equation (4) based on the equations (2) and (3).

$$Smax=\{(ts+\{r2-[r-(a-b)/2]2\}^{1/2})2+[a-(a-b)/2]2\}^{1/2} \quad (4)$$

Although the outer diameter a of the enlarged diameter portion 23 is preferably set as large as possible in order to make the aforementioned press-fitting margin (the outer diameter a of the enlarged diameter portion 23–the inner diameter d of the end turn portion 11) large, it should be as large as possible within a range meeting the outer diameter a of the enlarged diameter portion 23<the inter-element wire distance A in view of damage of the coil spring 3 at the time of the press-fitting and interference with the coil spring 3 after the press-fitting.

Since weight of the seat member 5 becomes large and centrifugal force acting on the coil spring assembly 1, for example, at the time of rotation of a damper becomes large if the axial length to of the enlarged diameter portion 23 is too long, the axial length should be set as small as possible within a range meeting the maximum diagonal length Smax (Smax1)>the inter-element wire distance A.

According to the present embodiment, the axial length to of the enlarged diameter portion 23 is set larger than the short diameter T of the element wire 7 of the coil spring 3. In particular, an axial length ts of the straight portion 25 is larger than an axial length tf of the front end portion 27, thereby to meet the maximum diagonal length Smax (Smax1)>the inter-element wire distance A and reduce the axial length of the enlarged diameter portion 23. In addition, the axial length ts of the straight portion 25 of the present embodiment is 0.5 times or more the short diameter T of the element wire 7 of the coil spring 3.

When assembling the seat member 5, the enlarged diameter portion 23 of the seat member 5 is press-fitted into the end turn portion 11 of the coil spring 3 as mentioned above.

At the time of the press-fitting, the enlarged diameter portion 23 is inserted into an inner periphery of the end turn portion 11 while diametrally enlarging and deforming the end turn portion 11. Since the outer diameter a of the enlarged diameter portion 23 is set smaller than the inter-element wire distance A of the end turn portion 11, the end turn portion 11 is prevented from being excessively diametrally enlarged and deformed, thereby to prevent the end turn portion 11 from being damaged.

After the assembling, the seat member 5 is prevented from being axially drop off from the end turn portion 11 due to the press-fitting margin of the enlarged diameter portion 23.

Further, as illustrated with two-dot chain line of FIG. 3(A), even if the seat member 5 is rotated so as to be inclined relatively to the axial direction of the coil spring 3, the seat member 5 is prevented from being drop off from the end turn portion 11 (rotational drop-off) since the maximum diagonal length Smax (Smax1) of the enlarged diameter portion 23 is larger than the inter-element wire distance A of the end turn portion 11.

Further, the transition portion 15 circumvents so as to gradually enlarge a convolution from the end turn portion 11 to the body portion 9 according to the present embodiment, so that the transition portion 15 does not come into contact with the enlarged diameter portion 23 or becomes a state of the zero-clearance even if the end turn portion 11 relatively moves in the diametral direction of the mounting shaft portion 21.

It is, therefore, possible to rotate the seat member 5 around its axis without loading the transition portion 15 of the coil spring 3 according to the present embodiment.

Additionally, the present embodiment keeps the outer diameter a of the enlarged diameter portion 23 small to surely prevent the transition portion 15 from coming into contact with the enlarged diameter portion 23 and reduce the load to the transition portion 15 of the coil spring 3.

Further, since the enlarged diameter portion 23 and the transition portion 15 do not interfere each other as mentioned above, a posture of the end turn portion 11 is stabilized and the bearing surface 11a of the end turn portion 11 is brought into stably contact with the receiving surface 19a of the seat member 5 according to the present embodiment.

Furthermore, the end turn portion 11 is arranged so as to avoid the corner between the seat portion 19 of the seat member 5 and the mounting shaft portion 21, thereby to bring the bearing surface 11a of the end turn portion 11 into more stably contact with the receiving surface 19a of the seat member 5.

It should be noted that the corner between the seat portion 19 of the seat member 5 and the mounting shaft portion 21 does not make a right angle and is configured to transition with a recessed and rounded portion (recessed and curved face) which is not illustrated as normal. If an end of the end turn portion 11 rides thereover, the bearing surface 11a of the end turn portion 11 floats from the receiving surface 19a of the seat member 5 and is not stabilized.

Further, since the axial length ts of the straight portion 25 of the seat member 5 is 0.5 times or more the short diameter T of the element wire 7 of the coil spring 3 according to the present embodiment, the seat member 5 is prevented from being drop off from the coil spring 3 (axial drop-off) even if a load acts so as to axially pull the seat member 5 out from the coil spring 3.

Figure 4:
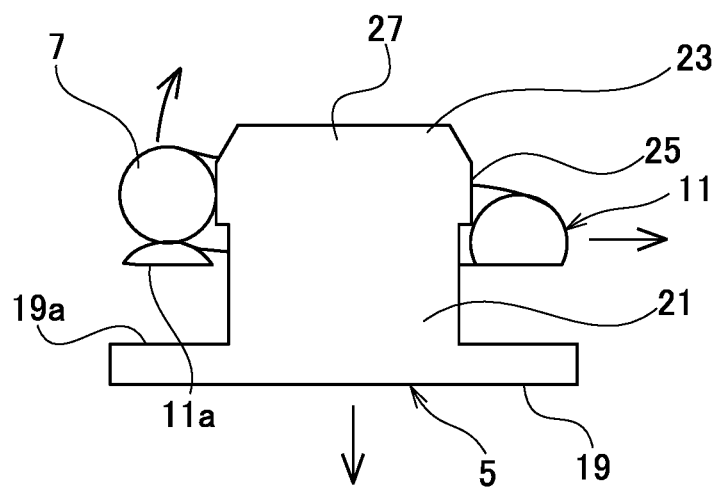
FIG. 4 is a sectional view illustrating movement of an element wire of the coil spring at the time of an axial drop-off.
Figure 5:
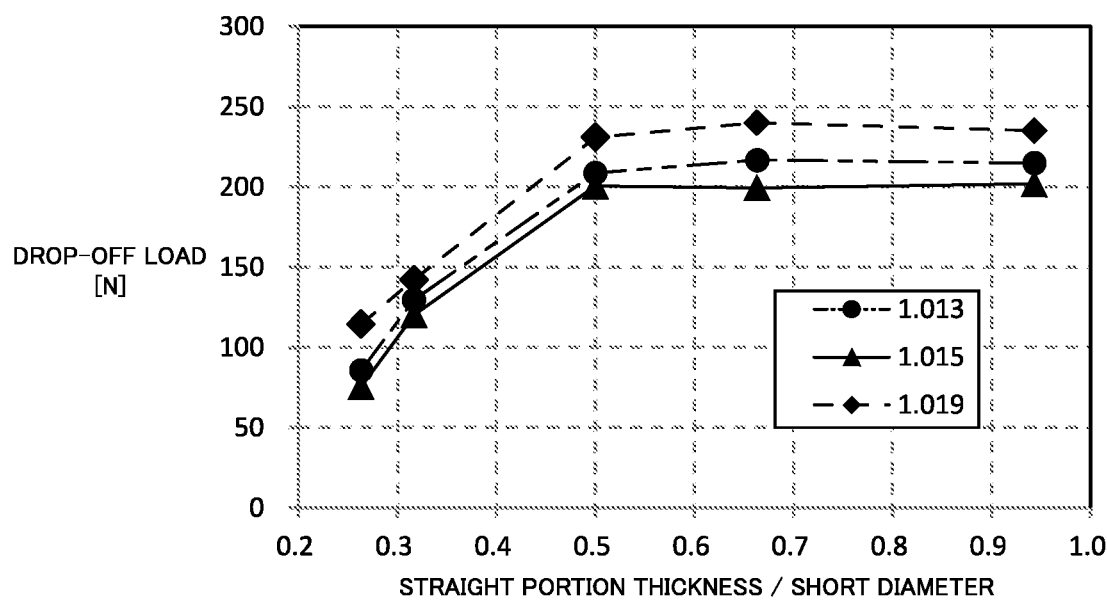
FIG. 5 is a graph illustrating change in a drop-off load according to change in an axial length of a straight portion of an enlarged diameter portion.

FIG. 4 is a sectional view illustrating movement of the element wire of the coil at the time of the axial drop-off, and FIG. 5 is a graph illustrating change of a drop-off load according to change of the axial length of the straight portion of the enlarged diameter portion.

As illustrated with arrows of FIG. 4, when a load acts so as to axially pull the seat member 5 from the coil spring 3, the end turn portion 11 is bending so that the coil spring 3 is rotated. When bending the end turn portion 11, a load required for the axial drop-off (drop-off load) is lowered and the axial drop-off tends to be caused.

FIG. 5 is one that drop-off loads are plotted relatively to axial lengths ts of straight portions 25 in three kinds of coil spring assemblies 1 which have press-fitting margins of the enlarged diameter portions 23 being 1.013, 1.015, and 1.019.

In addition, in FIG. 5, an ordinate represents the drop-off load, and an abscissa represents the axial length ts of the straight portion 25 with a ratio relative to the short diameter T of the element wire 7 of the coil spring 3. The press-fitting margins in FIG. 5 are represented as values of outer diameters a of enlarged diameter portions 23 divided by the inner diameter d of the coil spring 3.

As illustrated in FIG. 5, the drop-off load required for the axial drop-off increases in every press-fitting margin from 0.26 up to 0.5 of an axial length ts/short diameter T, and the coil spring assemblies 1 gradually becomes difficult for the axial drop-off of the seat members 5 to be caused. Over 0.5 of the axial length ts/short diameter T (up to 0.94 in FIG. 5), the drop-off load is leveled off in every press-fitting margin. Namely, over 0.5 of the axial length ts/short diameter T, reduction of the drop-off load caused by bending of the end turn portion 11 is prevented.

The axial length ts of the enlarged dimeter portion 23, therefore, is set in a range of 0.5 or more of the axial length ts/short diameter T. In a sense of reduction of the weight of the seat member 5, the axial length ts of the enlarged diameter portion 23 is preferably set so that the axial length ts/short diameter T is as small as possible within a range of 0.5 or more.

As mentioned above, in the coil spring assembly 1 of the present embodiment, the seat member 5 has the seat portion 19, the receiving surface 19a of which comes into contact with the bearing surface 11a of the end turn portion 11, the mounting shaft portion 21 protruded from the receiving surface 19a of the seat portion 19, and the enlarged diameter portion 23 formed at the front end of the mounting shaft portion 21 for guiding the press-fitting. Then, in the cross section along the axial direction of the coil spring 3, the outer diameter a of the enlarged diameter portion 23 is set larger than the inner diameter d of the end turn portion 11 and the axial length to of the enlarged diameter portion 23 is set so that at least the maximum diagonal length Smax (Smax1) of the seat member 5 is larger than the inter-element wire distance A.

Accordingly, even if the seat member 5 is rotated so as to be inclined relatively to the axis of the coil spring 3, the seat member 5 is prevented from the rotational drop-off due to that the maximum diagonal length Smax (Smax1) of the seat member 5 is larger than the inter-element wire distance A of the end turn portion 11.

Moreover, the rotational drop-off of the seat member 5 is prevented while preventing increase of the outer diameter a of the enlarged diameter portion 23 according to the setting of the axial length ta of the enlarged diameter portion 23 according to the embodiment 1. The end turn portion 11 is, therefore, prevented from being damaged due to excessive deformation at the time of the press-fitting of the enlarged diameter portion 23 of the seat member 5 into the end turn portion 11.

Furthermore, since the increase of the outer diameter a of the enlarged diameter portion 23 is prevented in this way, it is possible to prevent the coil spring 3 from interfering the end turn portion 11 after the press-fitting of the enlarged diameter portion 23 of the seat member 5, thereby to reduce the load to coil spring 3. Meanwhile, the posture of the coil spring 3 is stabilized to bring the bearing surface 11a of the end turn portion 11 into stably contact with the receiving surface 19a of the seat member 5.

Since the axial length ts of the straight portion 25 of the enlarged diameter portion 23 is larger than the axial length tf of the front end portion 27, it is possible to set the axial length ta of the enlarged diameter portion 23 shorter when the maximum diagonal length S is made larger than the inter-element wire distance A of the end turn portion 11, thereby to reduce centrifugal force acting on the coil spring assembly 1 at the time of the rotation of the damper.

According to the present embodiment, the axial length ts of the straight portion 25 is 0.5 times or more the short diameter T of the element wire 7 of the coil spring 3. This setting prevents the reduction of the drop-off load caused by bending the coil spring 3 so as to be rotated relatively to the axial direction of the seat member 5, to prevent the axial drop-off of the seat member 5. Accordingly, it prevents both the rotational drop-off and the axial drop-off of the seat member 5 as drop-offs of the seat member due to rotation between the coil spring and the seat member relative to the axial direction according to the present embodiment. It, however, may be configured to prevent only one of the rotational drop-off and the axial drop-off.

Further, the mounting shaft portion 21 of the seat member 5 is set to have the axial length defining the clearance or the zero-clearance between the enlarged diameter portion 23 of the seat member 5 and the end turn portion in the free state in which the end turn portion 11 is fitted to the mounting shaft portion and the bearing surface 11a of the end turn portion 11 is in contact with the receiving surface 19a of the seat portion 19 according to the present embodiment.

The load to the coil spring 3 is more surely reduced based on a synergic effect together with the setting of the outer diameter a of the enlarged diameter portion 23 according to the present embodiment.

Figure 6A:
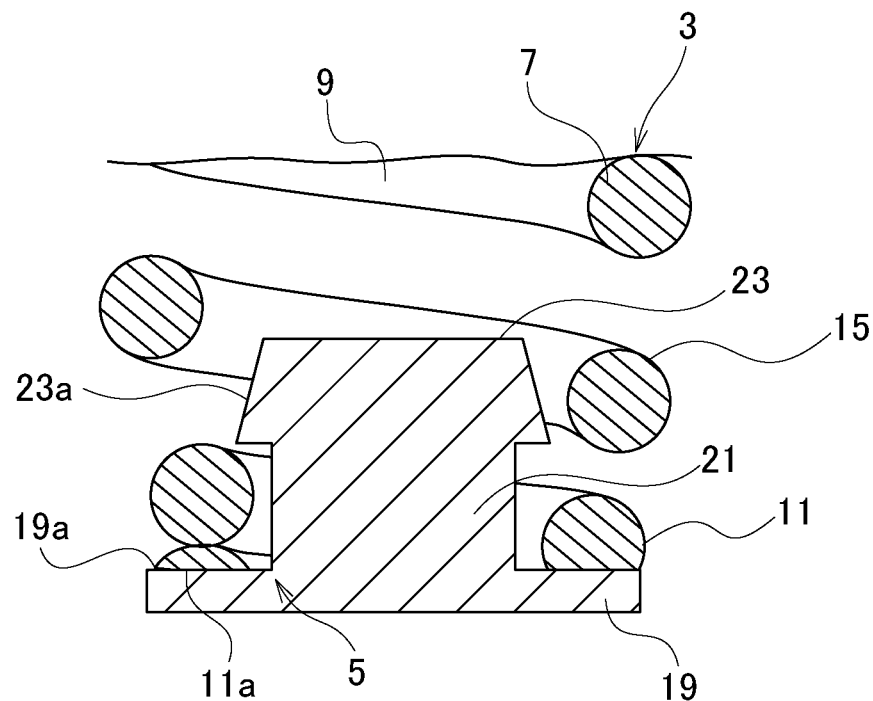
FIG. 6(A) is a sectional view illustrating a seat member attached to a coil spring and FIG. 6(B) is a sectional view showing a dimension of each part according to an embodiment 2 of the present invention.
Figure 6B:
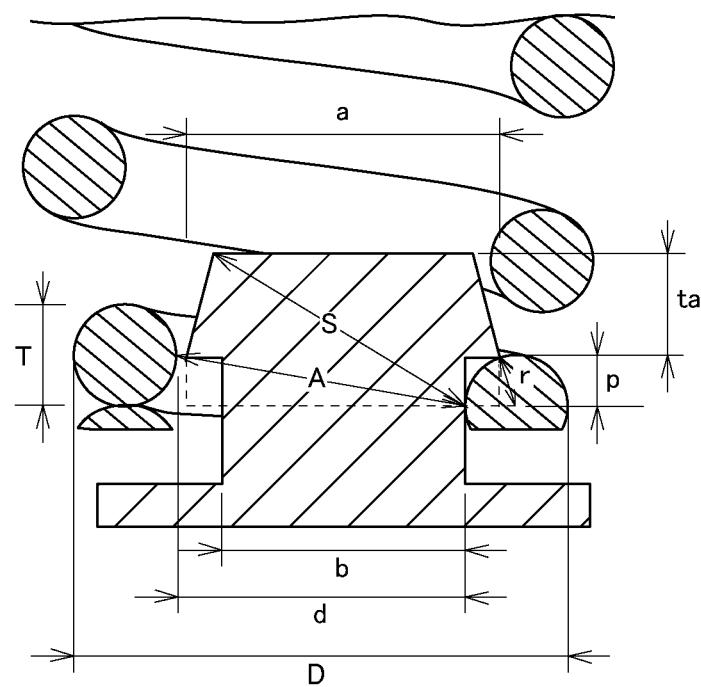

FIG. 6(A) is a sectional view illustrating a seat member attached to a coil spring according to a coil spring assembly of the embodiment 2 and FIG. 6(B) is a sectional view showing a dimension of each part. In addition, components in the embodiment 2 corresponding to those in the embodiment 1 are represented with the same numerals to eliminate duplicate explanation.

A coil spring assembly 1 of the present embodiment is one that a shape of an enlarged diameter portion 23 of a seat member 5 is changed into a frustum shape by comparison with the embodiment 1. Namely, a side face 23a of the enlarged diameter portion 23 is formed into a tapered shape as a whole. According to this tapered shape, the enlarged diameter portion 23, an outer diameter of which becomes minimum at a front end, has an outer diameter a at a base end on a mounting shaft portion 21 side. Further, a diagonal length S according to the present embodiment becomes maximum when a diagonal point is located at an upper end of the side face 23a. The others are the same as of the embodiment 1.

The embodiment 2, therefore, also provides the same effects as the embodiment 1.

Figure 7:
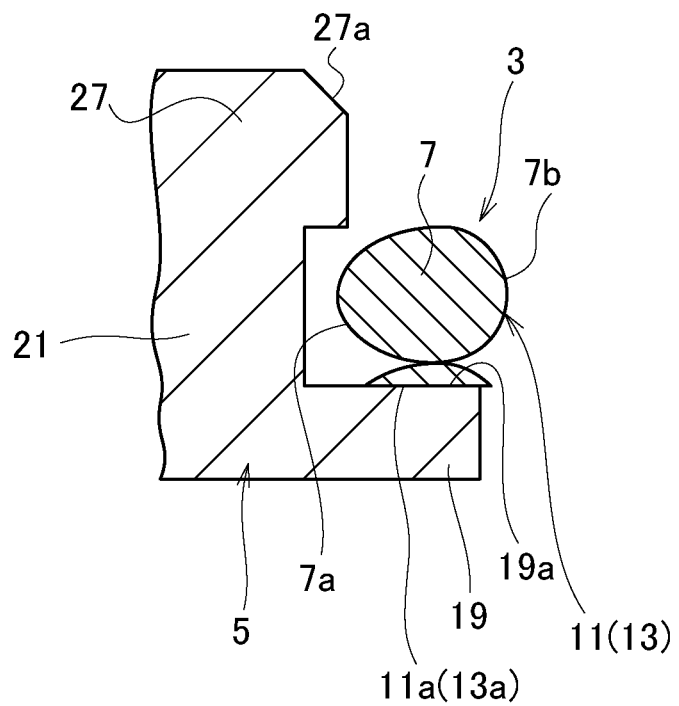
FIG. 7 is a partial sectional view of a seat member attached to a coil spring according to an embodiment 3 of the present invention.

FIG. 7 is a partial sectional view of a seat member attached to a coil spring in a coil spring assembly according to the embodiment 3. In addition, components in the embodiment 3 corresponding to those in the embodiment 1 are represented with the same numerals to eliminate duplicate explanation.

As illustrated in FIG. 7, a coil spring 3 of the present embodiment uses an element wire 7 having an oval cross section instead of the element wire having the circular cross section. In the coil spring 3, a cross section of a coil inner diameter side portion 7a of the element wire 7 is composed of, for example, a semi-oval shape portion, and a cross section of a coil outer diameter side portion 7b is composed of a semi-circular shape portion.

The embodiment 3 also provides the same effects as the embodiment 1. It should be noted that the coil outer diameter side portion 7b may be composed of the semi-oval shape portion and the coil inner diameter side portion 7a may be composed of the semi-circular shape portion. Further, each of the coil inner diameter side portion 7a and the coil outer diameter side portion 7b may be composed of the semi-oval shape portion so that a whole is formed into an oval cross section. Further, a semi-superellipse shape portion may be used instead of the semi-oval shape portion.

Figure 8:
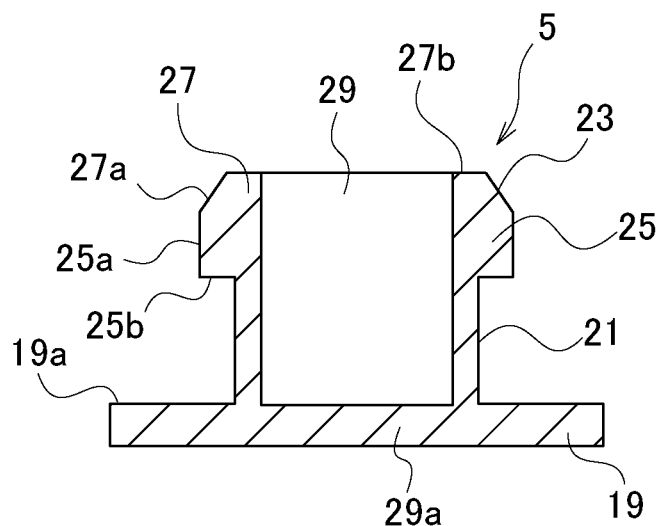
FIG. 8 is a sectional view of a seat member according to an embodiment 4 of the present invention.

FIG. 8 is a sectional view of a seat member according to the embodiment 4. In the embodiment 4, components corresponding to those in the embodiment 1 are represented with the same numerals to eliminate duplicate explanation.

According to the present embodiment, a seat member 5 has a hole 29 axially extending from a front end of an enlarged diameter portion 23. In the present embodiment, the front end of the enlarged diameter portion 23 is a front end face 27b. The others are the same as of the embodiment 1, but may be the same as of the embodiment 2 or 3.

A planar shape of the hole 29 is circular. The planar shape of the hole 29 may be, however, another geometric shape such as a rectangular shape. A diameter and an axial length (depth) of the hole 29 are preferably as large as possible as long as strength required for the seat member 5 is kept.

The hole 29 of the present embodiment is a bottomed hole and is open only on the front end face 27b of the enlarged diameter portion 23. The depth of the hole 29 corresponds to a sum of axial lengths of a mounting shaft portion 21 and the enlarged diameter portion 23. As a result, the hole 29 has a bottom portion 29a corresponding to an axial length (thickness) of a seat portion 19 of the seat member 5.

The embodiment 4 also provides the same effects as the embodiment 1. In addition, the embodiment 4 reduces the weight of the seat member 5 by the hole 29. As a result, increase of the weight of the seat member 5 is prevented even if an axial length to (referring to FIG. 3) of the enlarged diameter portion 23 is increased according to setting.

Further, since the hole 29 is the bottomed hole, the embodiment 4 reduces influence to a contact state against an opponent with which the seat portion 19 of the seat member 5 is in contact.

Figure 9:
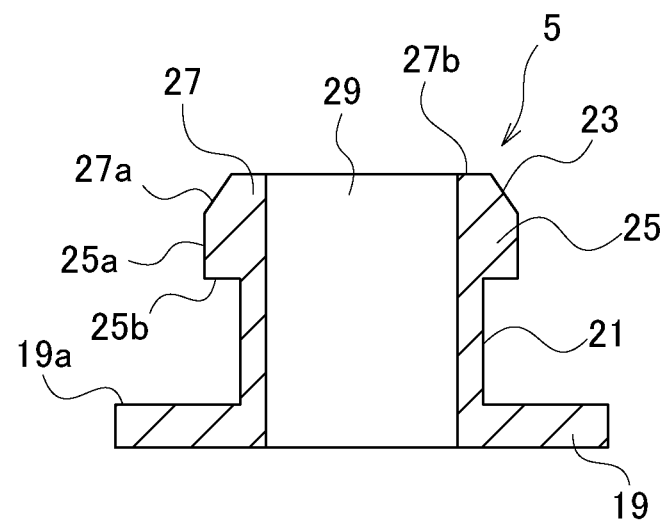
FIG. 9 is a sectional view of a seat member according to a modification of the embodiment 4 of the present invention.

FIG. 9 is a sectional view of a seat member according to a modification of the embodiment 4.

The modification of FIG. 9 is what a hole 29 is a through-hole axially passing through a seat member 5. The others are the same as the embodiment 4.

The modification also provides the effect due to the reduction of the weight of the seat member 5 like the embodiment 4.

It should be noted that the embodiment 4 and the modification is provided with the single hole 29, a plurality of holes may be provided instead. In this case, bottomed holes and through-holes may be mixed.

The invention claimed is:

1. A coil spring assembly comprising:
a coil spring that is provided with a respective end turn portion at each end of a body portion and a respective seat member attached to the coil spring at each of the end turn portions rotatably around an axis, wherein
each of the seat members has a seat portion, a receiving surface of which comes into contact with a bearing surface of the corresponding end turn portion, a mounting shaft portion protruded from the receiving surface of the seat portion, and an enlarged diameter portion formed at a front end of the mounting shaft portion for guiding press-fitting, an outer diameter of the enlarged diameter portion being larger than an outer diameter of the mounting shaft portion,
in a cross section along an axial direction of the coil spring, each of the seat members is configured so that the outer diameter of the enlarged diameter portion is set larger than an inner diameter of the corresponding end turn portion and an axial length of the enlarged diameter portion is set so that at least a maximum diagonal length of the seat member is larger than an inter-element wire distance,
the inter-element wire distance is a length of a straight line spanning between diametral innermost points at a 0.5-turn and a 1.0-turn of each of the end turn portions in a winding direction of the element wire of the coil spring,
the enlarged diameter portion of each of the seat members has a proximal straight portion having a side face extending straight along the axial direction of the coil spring and a distal end portion having a side face which is chamfered or tapered,
the maximum diagonal length of each of the seat members is a length of a straight line intersecting a central axis of the seat member and extending from a point of contact between an outer periphery of the element wire at the 0.5 turn of the end turn portion and the mounting shaft portion to an edge defined by a meeting of the respective side faces of the straight and distal end portions of the enlarged diameter portion of the seat member, and
an axial length of the straight portion of each of the seat members is longer than an axial length of the distal end portion and is 0.5-0.94 times a short diameter of the element wire of the coil spring.

2. The coil spring assembly according to claim 1, wherein the element wire of the coil spring has an oval cross section, a coil outer diameter side of which is configured by a semi-circular sectional shape portion of the element wire.

3. The coil spring assembly according to claim 1, wherein:
a maximum outer diameter of each of the enlarged diameter portions is set smaller than the inter-element wire distance of each of the end turn portions.

4. The coil spring assembly according to claim 1, wherein the coil spring has a respective transition portion between the body portion and each of the end turn portions, each of the end turn portions being formed up to a first turn so as to be reduced in diameter relative to the body portion, each of the transition portions gradually enlarged in diameter from respective the end turn portion to the body portion,
each of the mounting shaft portions is set to have an axial length defining a clearance or a zero-clearance between the enlarged diameter portion of the seat member and the respective end turn portion in a free state in which the end turn portion is fitted to the mounting shaft portion and the bearing surface of the end turn portion is in contact with the receiving surface of the seat portion, and each of the transition portions circumvents the enlarged diameter portion in a state in which the bearing surface of the respective end turn portion is in contact with the receiving surface of the seat portion.

5. The coil spring assembly according to claim 1, wherein the seat member has a hole axially extending from a front end of the enlarged diameter portion.

6. The coil spring assembly according to claim 5, wherein the hole is a bottomed hole.

7. The coil spring assembly according to claim 1, wherein the axial length of the enlarged diameter portion of each of the seat members is greater than the short diameter of the element wire of the coil spring.

8. The coil spring assembly according to claim 1, wherein $d>(a+b)/2$ in which d is an inner diameter of each of the end turn portions, a is a maximum outer diameter of each of the enlarged diameter portions and b is an outer diameter each of the mounting shaft portions.

9. A coil spring assembly comprising:

a coil spring that is provided with a respective end turn portion at each end of a body portion and a respective seat member attached to the coil spring at each of the end turn portions rotatably around an axis, wherein each of the seat members has a seat portion, a receiving surface of which comes into contact with a bearing surface of a respective one of the end turn portions, a mounting shaft portion protruded from the receiving surface of the seat portion, and an enlarged diameter portion formed at a front end of the mounting shaft portion for guiding press-fitting, each of the enlarged diameter portions has a proximal straight portion having a side face extending straight along an axial direction of the coil spring, and a distal end portion, a side face of the distal end portion being chamfered shape or tapered, an axial length of each of the straight portions is 0.5 times or more a short diameter of an element wire of the coil spring, and a maximum outer diameter of each of the enlarged diameter portions is set smaller than an inter-element wire distance of each of the end turn portions, the inter-element wire distance being a length of a straight line spanning between diametral innermost points at a 0.5-turn and a 1.0-turn of each of the end turn portions in a winding direction of the element wire of the coil spring.

10. The coil spring assembly according to claim 9, wherein
the element wire of the coil spring has an oval cross section, a coil outer diameter side of which is configured by a semi-circular sectional shape portion of the element wire.

11. The coil spring assembly according to claim 9, wherein
the coil spring has a respective transition portion between the body portion and each of the end turn portions, each of the end turn portions being formed up to a first turn so as to be reduced in diameter relative to the body portion, each of the transition portions gradually enlarged in diameter from the respective end turn portion to the body portion, each of the mounting shaft portions is set to have an axial length defining a clearance or a zero-clearance between the enlarged diameter portion of the respective seat member and the respective end turn portion in a free state in which the end turn portion is fitted to the mounting shaft portion and the bearing surface of the end turn portion is in contact with the receiving surface of the seat portion, and each of the transition portions circumvents the respective enlarged diameter portion in a state in which the bearing surface of the respective end turn portion is in contact with the receiving surface of the respective seat portion.

12. The coil spring assembly according to claim 9, wherein
each of the seat members has a hole axially extending from the distal end portion of the enlarged diameter portion.

13. The coil spring assembly according to claim 12, wherein
each of the holes is a bottomed hole.

14. The coil spring assembly according to claim 9, wherein
the axial length of the straight portion of each of the seat members is greater than the axial length of the distal end portion, and the axial length of the enlarged diameter portion of each of the seat members is greater than the short diameter of the element wire of the coil spring.

15. The coil spring assembly according to claim 9, wherein
$d>(a+b)/2$ in which d is an inner diameter of each of the end turn portions, a is a maximum outer diameter of each of the enlarged diameter portions and b is an outer diameter of each of the mounting shaft portions.

\* \* \* \* \*